No. 897,333. PATENTED SEPT. 1, 1908.
H. A. W. WOOD.
ASSOCIATING AND COLLECTING MECHANISM.
APPLICATION FILED MAR. 4, 1898. RENEWED JAN. 24, 1908.

Witnesses.
Inventor.

No. 897,333.

PATENTED SEPT. 1, 1908.

H. A. W. WOOD.
ASSOCIATING AND COLLECTING MECHANISM.
APPLICATION FILED MAR. 4, 1898. RENEWED JAN. 24, 1908.

Witnesses.
W. J. Baldwin
M. M. O'Reilly

Inventor.
H. A. W. Wood
By
Southgate & Southgate
Attorneys.

No. 897,333.

PATENTED SEPT. 1, 1908.

H. A. W. WOOD.
ASSOCIATING AND COLLECTING MECHANISM.
APPLICATION FILED MAR. 4, 1898. RENEWED JAN. 24, 1908.

Witnesses.
W. J. Baldwin
M. M. O'Reilly

Inventor.
H. A. W. Wood
By
Southgate & Southgate
Attorneys.

Fig. 12.

No. 897,333. PATENTED SEPT. 1, 1908.
H. A. W. WOOD.
ASSOCIATING AND COLLECTING MECHANISM.
APPLICATION FILED MAR. 4, 1898. RENEWED JAN. 24, 1908.

Witnesses.
W. J. Baldwin
M. M. O'Reilly

Inventor.
H. A. W. Wood
By
Southgate & Southgate
Attorneys

UNITED STATES PATENT OFFICE.

HENRY A. WISE WOOD, OF NEW YORK, N. Y., ASSIGNOR TO CAMPBELL PRINTING PRESS & MANUFACTURING COMPANY, OF NEW YORK, N. Y., A CORPORATION OF NEW YORK.

ASSOCIATING AND COLLECTING MECHANISM.

No. 897,333.   Specification of Letters Patent.   Patented Sept. 1, 1908.

Application filed March 4, 1898, Serial No. 612,548.  Renewed January 24, 1908.  Serial No. 412,492.

*To all whom it may concern:*

Be it known that I, HENRY A. WISE WOOD, a citizen of the United States, residing at New York, in the county of New York and State of New York, have invented a new and useful Associating and Collecting Mechanism, of which the following is a specification.

The aim of this invention is to produce new and improved devices for assembling the product of a printing press or printing presses, and further consists, in connection with the above, of a peculiar means for permanently securing the assembled product; and this peculiar means consists of a wire-stapling device, which may be, if desired, of the form hereafter described. By the term "product" is meant that portion of the printed and assembled strips or sheets of paper which forms, or which is designed to form, when severed from the body of the strip or strips, a newspaper, pamphlet, or volume.

To these ends, the invention consists of the devices described and claimed in this specification, and illustrated in the accompanying seven sheets of drawings, in which.

Before describing the invention, this division and definition of the terms hereafter used will be made. By the use of the word "assembling" is meant broadly either collecting or associating either sheets or webs. By the use of the word "collecting" is meant the superimposing of a number of sheets which may be severed from a web, or otherwise taken into the mechanism, so that the product will be a number of sheets superimposed one on the other. By the term "associating" is meant the laying together of a plurality of different webs, or the slitting and laying together of parts of a wide web so as to form a plurality of superimposed narrow webs.

With this explanation, it may be said that the invention consists in the combination with an assembling mechanism of a stationary wire stapling device which is adapted to permanently secure or fasten the assembled product, and this assembled product may be obtained either by associating webs or collecting sheets.

It is the further aim of the invention to combine with the above, devices whereby a cover may be added to the assembled and stapled product.

In the drawings a number of ways are shown by which the invention can be practiced.

So far as the broad scope of the invention is concerned, the printing mechanism may be of any approved form either a continuous web, or a separate sheet printing mechanism. The assembling mechanism may be of any approved form, and the stationary wire stapling device may be of any approved form.

The specific stationary wire stapling device which is preferably used will be first described, and reference to follow this description should be had to the first two sheets of drawings, which show a single stapling device, which may be nicely used to carry out the invention.

Figures 1, 2:
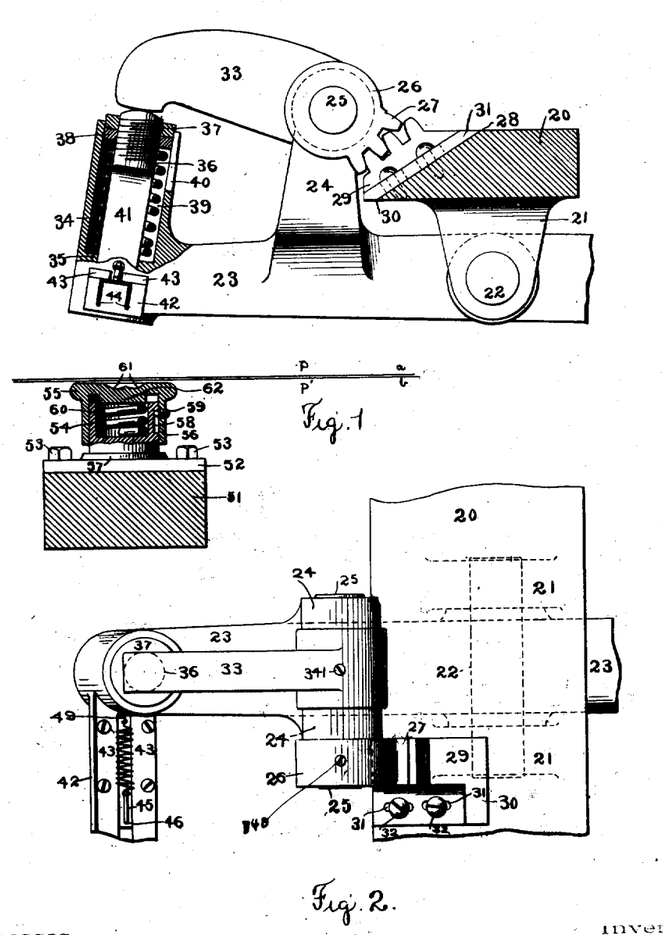
Figure 1 is a sectional elevation on an enlarged scale of the preferred form of wire-stapling device.
Fig. 2 is a plan of the same.

In the drawings, 20 and 51 are supposed to represent transverse beams or supports, upon which the stapling device may be mounted.

As hereafter described, a single stapling device may be used to insert a longitudinal row of staples in the assembled product, or a plurality of stapling devices may be used side by side, so as to insert a transverse line of staples into the assembled product; or a plurality of stapling devices arranged parallel to the movement of the assembled product may be used to thereby insert a longitudinal line of staples.

The further description of the specific wire stapling device will be confined to one stapling device, the necessary changes where a plurality are used being hereafter specified.

Figures 3, 4:
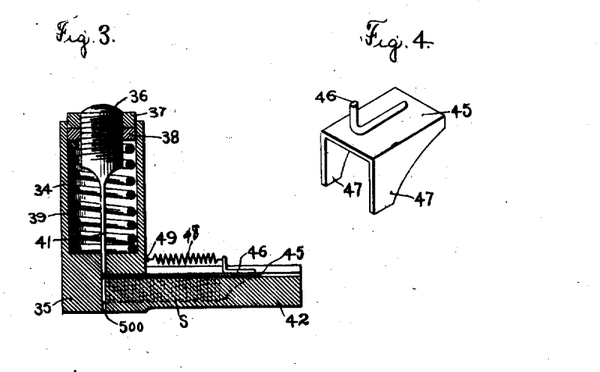
Fig. 3 is a section of the plunger which sets the staples.
Fig. 4 is a detail of the feeder.
Figure 5:
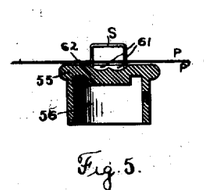
Figs. 5 to 7 are diagrams illustrating the way in which the staple is set or closed.
Figure 6:
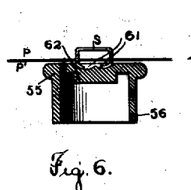
Figure 7:
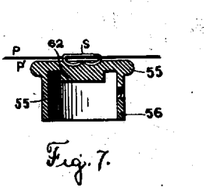

The upper transverse beam or support 20 has depending arms or brackets 21, in which is mounted a short shaft 22. On this short shaft 22 is fulcrumed a vibratory lever or arm 23, which arm is actuated to insert the staples, as hereafter described. Extending up from the left hand portion of this arm 23 are brackets or arms 24, in which is journaled shaft 25, on one end of which shaft is secured piece 26, which has gear-teeth as 27 formed thereon; and this piece 26 may be pinned as by pin 340, or otherwise securely fastened to the shaft 25. The transverse beam 20 has an inclined cut-away portion 28, as indicated, fitting on which is the segment 29, which has an extending ledge or shoulder 30, in which are formed slots 31, through which are passed screws 32, which are tapped into the beam 20, and which serve to hold the segment 28 in place. The teeth of this segment are preferably arranged approximately concentric to the shaft 22, for a purpose hereafter described, and it will be seen that by loosening the screws 32, the segment 29 can be adjusted up and down the ledge 28, and by this means, the relative position of the mallet to the plunger can be adjusted. Also mounted upon the shaft 25, and between the bearings 24 is a mallet or striking piece 33, which may be securely fastened to the shaft 25, as by means of pin 341. On the end of the vibrating arm or lever 23 is formed the stapling head 34, which consists of a hollow tube as shown, which has a reinforced bottom as 35. Fitting in the stapling head 34 is a striking head or plunger 36, the end of which is screw-threaded, as shown, and fitted upon which are nuts 37 and 38. Surrounding the plunger beneath the nut 38 and bearing on the reinforced portion 35 is a spring 39, which tends normally to keep the plunger elevated; and by means of the nuts 37 and 38, the tension of this spring can be regulated. The striking head 34 is cut away as at 40, so that the mallet 33 can move down a considerable distance into the striking head. The lower end of the plunger 36 is drawn down as at 41 so as to form a thin, smooth piece, which fits into a hole 500 formed in the lower part of the reinforced striking head, as shown; and this drawn-down portion 41 is made of just the width in its narrow way of the staples, which it is desired to use. The striking head 34 has an extending reservoir 42, in which the staples may be placed, or to which they may be fed; and fitting on top of this reservoir are covers 43.

Formed in the reservoir 42 are slots 44, which slots, with the covers 43, form perfect guide-ways for the staples S. Fitting into the slots 44 and under the covers 43 is a feeder 45, which has extending wings 47, which fit down into the slots 44, and which thus feed the staples into the striking head.

Soldered or fastened on top of the feeder 45 is a wire 46, and arranged between this wire and a projection 49 carried by the head 34, is a spring 48, which tends to pull the feeder towards the striking head, and to feed the staples under the plunger.

The device for receiving and bending the staples is arranged on the transverse beam 51 below the striking head 34, and consists of a support 52, which is secured to the beam 51 by means of screws 53, and which has a projecting, hollow, cylindrical hub 54. Fitting on this projecting, hollow, cylindrical hub 54 is a clenching-plate 55, which has an extending, hollow, cylindrical part 56, which is adapted to strike or come into contact with a collar 57 formed on the support 52. The cylindrical hub 54 has a slot 58 formed in the same, and a screw 59 is inserted in the clenching-plate 55, and prevents the clenching-plate 55 from turning. A spring 60 is arranged between these two parts, and tends to force the clenching-plate 55 to its highest position, the screw 59 limiting the upward movement of the clenching-plate 55. The clenching-plate 55 has suitable grooves 61, or is suitably adapted, so that when the staple is inserted through the assembled product, the staple will be headed over in the groove 61. The clenching-plate 55 is preferably reinforced as at 62 under the cut-away portion 61, as shown.

The operation of this stapling device is as follows: The assembled product, which may consist of a plurality of sheets P, P¹, or webs $a$, $b$, is led in, in any suitable manner, between the clenching-plate and the striking head and momentarily stopped. The right-hand end of the arm 23 is then forced quickly upwards by any suitable means, as by an eccentric, as hereafter described, which will cause the striking head to descend, and hold the assembled product between the striking head and the yielding clenching-plate, and, as the striking head 34 descends, the mallet 33 will be given an accelerated downward movement, due to the action of the gear-teeth 27 running down the stationary gear-teeth 29, and thus the staple under the plunger will, as the striking head descends, be forced outward, and forced through the assembled product. As soon as the ends of the staple pass through the assembled product, they will come into the grooves or channels 61 formed in the yielding clenching-plate 55, and will be headed over and set, as shown in the diagrams in Figs. 5, 6 and 7. As the striking head is raised, the plunger 41 will be lifted by the spring 39 above the line of staples, and a new staple will be fed into the slot 500, by means of the spring 48.

The yielding clenching-plate 55 forms a nice and easy means for setting the staples, and it will be seen that the device admits of adjustment by means of screws 32 and nuts 37 and 38, so that the whole device can be arranged and set to operate very rapidly and nicely. In some cases, where the stapling device must operate for a long time, a stapling former and feeding device, which will continuously form and feed the staples beneath the plunger is used, many such being well known, and not necessary here to detail, the invention contemplating the use of any form of stationary wire stapling, which will permanently fix and bind together the assembled product. In some cases, if desired, the mallet of the device before described may be driven by other means, which means may be independent of the movement of the arm 23.

Figures 8, 9:
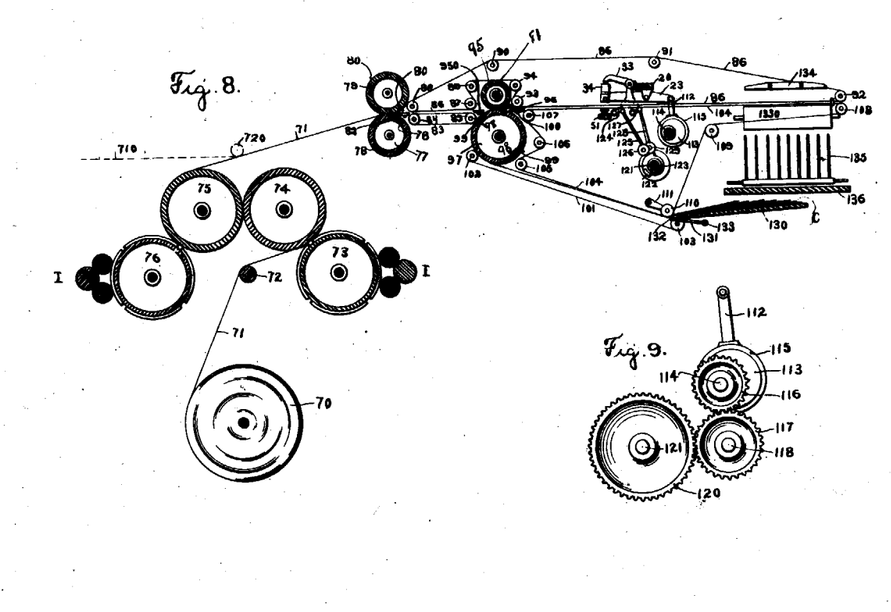
Fig. 8 illustrates the combination of a press with a collecting mechanism and my wire stapling device applied thereto, Fig. 8½ is an enlarged view of the stapling and assembling mechanism shown at the right of Fig. 8.
Fig. 9 is a view on an enlarged scale of the gearing used in connection with the stapling device.
Figure 8:
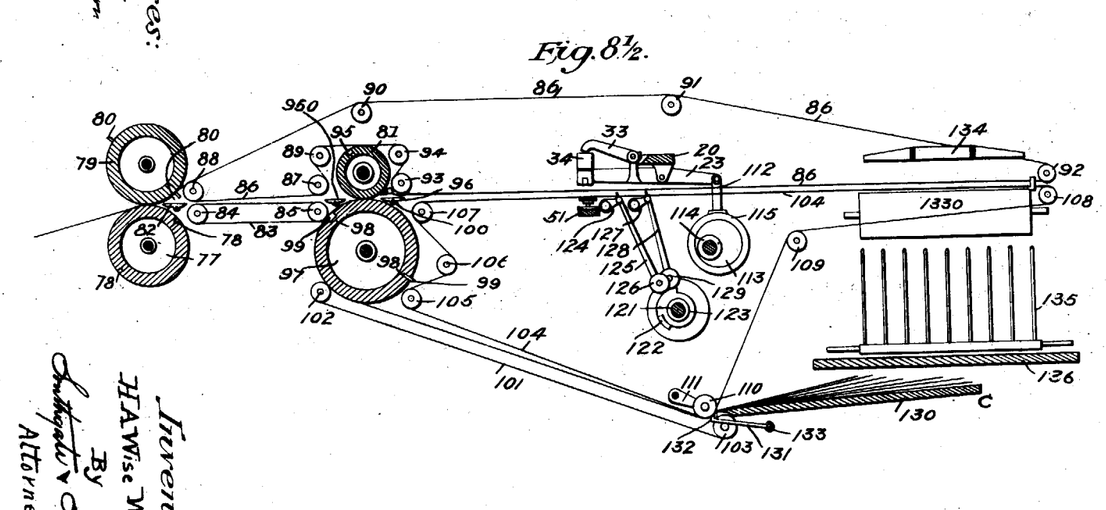

Referring now to Figs. 8 8½ and 9, one way is shown in which a stationary stapling device can be combined with a collecting mechanism, and also means is shown by which a cover may also be combined with the finished product. In this device, it will be seen that the collecting mechanism is shown as taking its supply from a printing mechanism. In this specific device, 70 represents a web-roll from which the web 71 is led. From the web-roll, the web passes around a roller 72, then around the impression cylinder 74, then around to the impression cylinder 75. Coacting with the impression cylinder 74 is the first type cylinder 73, and coacting with the second impression cylinder 75 is the second type cylinder 76, which type cylinders can be inked by any suitable inking apparatus as I, which are not necessary here to show or describe at length.

The type cylinders are preferably made of a circumference so as to receive four plates around the same, so that a variety of products can be produced, as hereafter described. Thus, for example, if the first and second plates of the type cylinders are different, and the third and fourth plates are like the first and second, the first sheet may be associated with the second, and the third with the fourth, and two distinct double-sheet products may be produced, which are duplicate; or, if two distinct and unlike products are to be run, all the plates will differ, and the first complete product will not be like the second. Or again, if it is desired to produce a complete quadruple-sheet product, then all the plates will be different, and all the four sheets will be collected, as hereafter described. Thus, it will be seen that a printing couple which has four plates arranged circumferentially on the type cylinders is capable of producing a product, which may be cut and collected into a number of differently paged products.

From the last impression cylinder 75, the web 71 is led between the cutting cylinders 77 and 79, which are made one-half the size of the type cylinders, the upper cylinder 79 of which has two knives as 80, and the lower cylinder 77 of which has two recesses 78, whereby the web will be cut into four sheets for the length of one circumference of each type-cylinder. The knives 80 do not completely sever the sheet from the web, but simply perforate the web. From the cutting cylinders, the web is carried over guides 82, and is led in between the bite of the continuously running tapes 83 and 86. The tapes 83 are mounted upon the tape pulleys 84 and 85, and the tapes 86 are mounted upon tape-pulleys 88, 87, 89, 94, 93, 92, 91 and 90, as shown, and these tapes are run at a faster speed than the peripheral speed of the cutting cylinders.

Arranged beyond the tape pulleys 85 and 87 is a collecting cylinder 97, and the nipping or biting cylinder 81, which may be also used as a collecting cylinder in some cases, as hereafter described. The web is directed from the tapes 83 and 86 between these cylinders 81 and 97 by means of suitable guides 950.

Arranged in the collecting cylinder 97 are rubber pads 98, at 180 degrees from each other, and through these rubber pads may be inserted impaling pins 99, as shown. Impaling pins as 95 may be also inserted into the nipping cylinder 81. All the impaling pins are removable, and are only used as desired.

Coacting with the collecting cylinder 97 is a set of stripper fingers 100, which may be operated by any of the usual means to strip the collected product from the collecting cylinder; and a similar set of fingers 96 is arranged to coact with the cylinder 81, and to strip the products from their cylinder, and deliver the same on to the strippers 100. It will be seen that the tapes 86 are led around the nipping cylinder 81 so that the tapes are clear of the same. From the cutting cylinders 77 and 79, the web is carried between the tapes 83 and 86, until the end of the same comes in between the nipping cylinder 81 and the collecting cylinder 97, when one of the rubber pads 98 seizing the end of the web, will tear the sheet from the web on the line of the perforations, which have been made by the cylinders 77 and 79, and this will leave the leading end of the web in the bite of the tapes 83 and 86, so that the sheets will be nicely severed from the web as the cylinders 81 and 97 have a higher peripheral speed than the web has.

Coacting with the cylinder 97 is a set of tapes 101, which tapes are led around tape-pulleys 102 and 103, as shown, and coacting with the tapes 101 is a set of tapes 104, which tapes 104 run around tape-pulleys 105, 106, 107, 108 and 109, and drop-roller 110, which may be mounted in suitable arms 111. By these tapes, a sheet may be fed to the collecting cylinder to form either a supplement or a cover, as hereinafter described.

The collected product passes from the strippers 100 in the grasp of the tapes 86 and 104, in through the stapling device, which is constructed, as before described. The arm 23 of this stapling device may be operated by means of an arm 112, which carries an eccentric-strap 115, which fits upon an eccentric 113 secured to the shaft 114. The shaft 114 carries a suitable gear 116, which meshes with an intermediate 117 mounted upon the shaft 118, and this intermediate 117 meshes with and engages a gear 120, secured upon a shaft 121. Also fastened on this shaft 121 are two cams as 122 and 123. Just beyond the anvil of the stapling device is arranged a pivoted stop 124, which has a suitable yoke or connection 125, which carries a roller 126, which bears upon the cam 123. Arranged beyond the pivoted stop 124 is another pivoted stop 127, which has a suitable yoke 128, which carries a roller 129, which bears upon the cam 122. These stops 124 and 127 are arranged so that when they are lifted, they will project up between the tapes 104 and 86, and will momentarily stop the assembled or collected product. Thus, after the collected product leaves the strippers 100, the same will travel until the forward or leading edge strikes the stop 124, when it will be momentarily held, and the stapling device will insert the staple. Then the stop 124 will be lowered, and the product will again move until the leading edge strikes the stop 127, when another staple will be inserted. This will insert a longitudinal line of staples in the assembled product; and, of course, as many staples as desired can be inserted in the assembled product, depending, of course, upon the number of stops used. In the particular device shown, two staples are inserted, the eccentric making two revolutions to one revolution of the shaft 121, and thereby being properly timed.

From the stapling device, the sheets pass forward to any suitable delivery or folder device, as over folding rollers 1330, between which, the assembled and stapled product is tucked by the tucker-blade 134, and from which, the product may be delivered, as by means of a fly 135 upon a suitable receiving table 136. As before stated, supplements or covers can be fed in between the tapes 101 and 104, and the covers or supplements may be fed from a suitable feed-table as 130, and are indicated by the letter C.

A suitable check device, as 131, may be arranged upon the shaft 133, and may have a nose 132, and this device may be so arranged that it will only be possible to feed the cover or supplement in at the proper time. The roll 110 mounted in the arms 111 may be also arranged, if so desired, to act as the usual drop-roll, to seize and forward the sheet at the proper time. This check device and drop-roll are the same in construction as used on sheet printing presses, and on folding machines in which sheets are fed into the mechanism, and are familiar to those acquainted with this art, and it is therefore not thought necessary to detail the operating mechanism of the same at length.

The gearing for the stapling device can be operated at the proper time, depending upon the number of assembled products that come from the collecting mechanism. The cylinder 97 is driven turn for turn with the cutting cylinders, but is made about one-fourth, in diameter, larger than the cutting cylinders; and, by this means, will have the peripheral speed necessary for pulling the sheets from the end of the web, and all the tapes are preferably run at the same speed as the peripheral speed of the collecting cylinder 97. The nipping cylinder 81 is preferably made one-half the diameter of the collecting cylinder 97, and is arranged to turn at the same peripheral speed, or two turns for one of the collecting cylinder 97. It is understood, of course, that the tucker or folding blade 134 and the fly 135 will be timed to act so as to fold and deliver the product at the proper time.

All these mechanisms and gearings are well understood and known in connection with web-presses and folding machines, and it is not necessary to go into detail to describe the same, to give a skilled mechanic a full idea of my invention.

Suppose now, that it is desired to run single sheets through the press. Then all the impaling-pins would be removed from the cylinders 97 and 81, the stapling device and the stops would be arranged so as to be inoperative, and the sheets would be pulled from the web, and given one fold, and delivered, as desired, the fly, of course, being properly timed, and thus four, four-page papers, once folded, would be delivered for each revolution of the type-cylinders, the stapling device and stops, of course, being rendered inoperative during this operation.

Suppose now, in the second case, it is desired to collect two sheets, so as to form an eight-page product, and to deliver for each revolution of the type-cylinders, two similar, eight-page products, or two different eight-page products, depending upon the arrangement of plates used upon the type-cylinders. In this case, the impaling-pins 95 are inserted in the small collecting cylinder 81, and the strippers 96 are set to operate as every second revolution of the cylinder 81. Then the first sheet fed in between the cylinders 97 and 81 will be carried up around the cylinder 81, and the next following sheet will be collected with the first sheet, and then the two sheets will be stripped from the cylinder 81 by the strippers 96, and will be carried forward between the tapes 86 and 104 through the stapling mechanism, and will be stopped, stapled, started, stopped, stapled, and thereafter delivered as desired.

Suppose now, in the third case, it is desired to collect all four sheets printed by one revolution of the type-cylinders. Then the impaling pins 99 will be placed in the collecting cylinder 97, and the impaling pins 95 will be left in the nipping cylinder 81, and the strippers 96 will be set to operate as hereafter described, and the strippers 100 will be timed to operate once for each two revolutions of the cylinder 97. Then the first two sheets will be taken one after the other upon the collecting cylinder 97, and the third sheet will be taken or received upon the first sheet. These two superimposed sheets will then be taken by the upper cylinder 81. When the head of the second sheet on the cylinder 97 reaches the point where the sheets pass to the cylinder 97, the fourth sheet will be received by the impaling-pins 99 on top of the second sheet. Then when the forward edges of all four sheets come together, the strippers or switches 96 and 100 will direct the four-sheet product thus formed, into the bite of the tapes 86 and 104. From this point, the sixteen-paged product, consisting of the four, four-paged sheets, will be carried on, stopped, stapled, started, stopped, stapled, started, folded, and delivered. By this operation, it will be seen that a sixteen-page paper will be formed, bound together and delivered once folded for each revolution of the type-cylinders. Thus, by the printing and collecting and stapling mechanism before described, either single sheet, collected double sheet or collected quadruple sheet products can be produced. In some cases, it is desired to add a cover or a supplement to these products, and this can be nicely done by feeding either the cover or supplement from the feed-board C, the stop 132 and the drop-roll 110 being timed so as to lead the supplement or cover in at the proper time. In the first case, if it is desired to lay covers on the single sheet product, two covers will be fed in for each revolution of the collecting cylinder 97, the impaling pins 99 being used in this case, and will be carried up by the impaling-pins 99 and collected under the single sheets. From the collecting cylinder, the cover and single sheet will be stapled, folded and delivered, as before described.

When it is desired to put a cover on the eight-page product, only one cover is fed in for each revolution of the collecting cylinder 97, and when it is desired to put a cover upon the sixteen page collected product, one cover is fed in for each two revolutions of the collecting cylinder. Of course, this fed-in sheet, instead of being considered as a cover, can be considered as a supplement, and under some conditions, can be used as an insert. This supplement or cover may, of course, be a full width or a half width sheet, so that a half cover can be added or only a one page supplement. By this means, it will be seen that a great variety of products can be produced, with comparatively simple mechanisms, and that by momentarily stopping the collected product, one or more times, the same can be permanently and nicely bound together. Thus, this press can be arranged to supply either four four-page papers, two eight-page papers, either similar or different, or one sixteen page paper for each revolution of the type-cylinders; or, if a half-width cover is added, it can produce the above with a two-page cover; or if a full width cover is added, it can produce the above with a double page cover. Of course, in feeding in the supplement or cover of one page width to constitute two pages, a wide margin is left, which can be nicely stapled to the remaining sheet or sheets, and can be nicely folded. Of course, instead of leading a single web to the cutting cylinders 77 and 79, a plurality of webs can be used, for example another web 710 can be led from another printing mechanism, and associated with the web 71 on the roll 720, whereby the product can be still further increased, or, of course, the web 71 can be associated to form two webs, and the product increased by that means.

Thus, it will be seen that the device constitutes an improved collecting mechanism, means for momentarily stopping the assembled product, and a stationary stapling device adapted to insert staples to permanently bind the collected product together, while the same is stationary, so as to give a longitudinal line of staples, and of a folder adapted to give the collected and bound product a fold on the line of the staples. This will give a press which is adapted for a great variety of pamphlet and newspaper work.

In the previously described construction the assembling mechanism consists of a mechanism by which sheets are collected before the stapling operation.

The scope of the invention, as before described, includes any assembling device, and the device shown in Fig. 10 will now be described, which covers a device by which different webs are associated, momentarily stopped and stapled, and then thereafter folded.

Figures 10, 11:
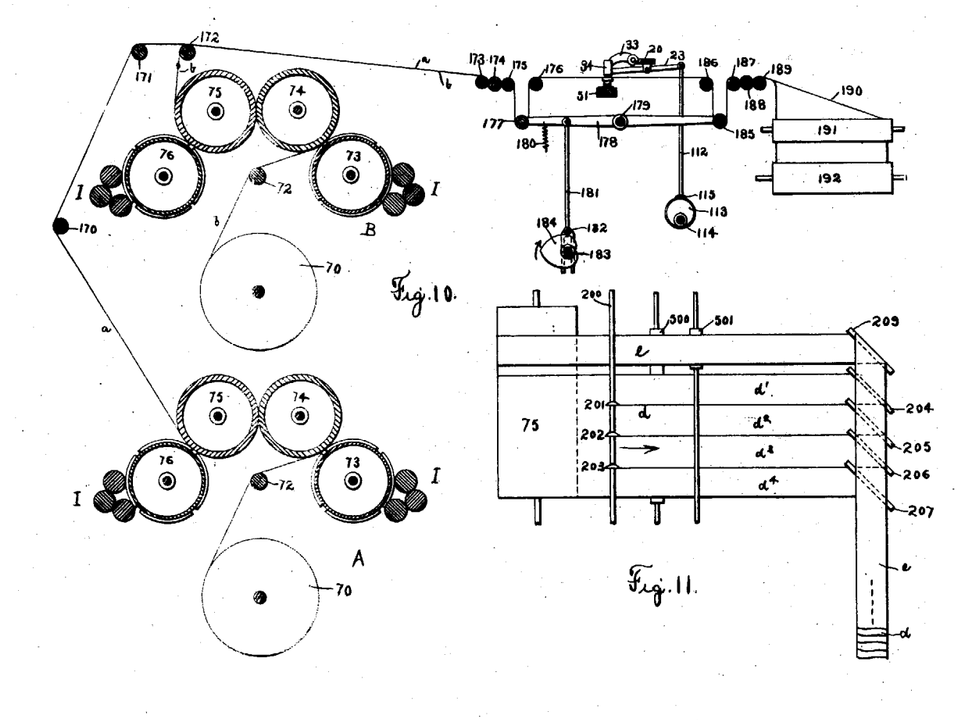
Fig. 10 illustrates the combination of two printing mechanisms, an associating mechanism, and a stapling device.
Fig. 11 illustrates in plan how the product of one press may be associated.

Referring to Fig. 10, it will be seen that A and B represent two sets of printing couples, which may be substantially the same as before described, the web $a$ being printed from the couples A, and the web $b$ being printed from the couples B. From the first printing couples, the web $a$ is led around the guide rollers 170 and 171 to the guide roller 172; and from the second printing couples, the web $b$, printed thereby, is led to the roll 172, and at the roll 172, the two webs $a$ and $b$ are associated together. From the roll 172, the two associated webs pass to the continuously running rollers 173, 174 and 175, then down around the looping roller 177, which is mounted in the arms 178, which arms 178 are mounted upon the shaft 179, and a spring 180 is arranged so as to keep the looping roller 177 normally in its lowest position. Connected to one of the arms 178 is a yoke 181, which carries a roller 182, and this yoke straddles and engages the shaft 183, which carries a cam 184, against which cam 184, the roller 182 bears. Mounted on the other end of the arms 178 is a looping roller 185, and it will be seen that by this means, the looping rollers 177 and 185 are oppositely moved.

From the looping roller 177, the webs are led up over the stationary roller 176 to the stationary roller 186 down under the looping roller 185, then in through the bite of the continuously running rollers 187, 188, and 189, and from these, the associated webs may pass to a longitudinal former 190, which has the usual presser-rolls or drums 191 and cutting cylinders 192, from whence the assembled, stapled, folded, and cut-off product may be delivered by any suitable means not necessary here to show. A stapling device is arranged in the path of the associated webs between the rollers 176 and 186. It will be seen that by means of the looping rollers 177 and 185, the associated webs between the rollers 176 and 186 are kept momentarily stationary, and are thereafter fed forward at an accelerated speed. This movement of the associated webs is obtained as follows:—The loopers 177 and 185 are arranged to move at half the speed of the associated webs. Then as the looper 177 moves down, all the length of the webs coming over the roller 175 will be taken up by this downward movement of the looper 177, and the associated webs will be held stationary beyond the roller 176. During this operation, the upward movement of the looper 185 will supply the necessary length of associated webs to provide a constant movement through the rollers 187, 188 and 189.

When the loopers reverse their movement, the associated webs will be shifted at double speed between the rollers 176 and 186. That is to say, when the looper 185 moves downwardly, the same will pull the web back of the same, forward, at the speed at which the webs are moved, and at the same time, the rollers 187, 188 and 189 are acting in addition which will give a movement of the associated webs between the rolls 176 and 186 at double speed. The length of the associated webs for this movement will be supplied by the upward movement of the looper 177, and the turning of the rolls 173, 174 and 175. The cam, which actuates the looping rollers may be, if desired, approximately heart-shaped. When the associated webs are stationary between the rollers 176 and 186, the stapling device is caused to act, and, by this means, it will be seen that a longitudinal line of staples can be inserted in the associated webs. By arranging a row of stapling devices side by side, a transverse line of staples can be inserted into the superimposed webs while they are held momentarily stationary. By this mechanism, it is possible to associate webs, and nicely staple the same together, the momentary stationary relation between the associated webs and the stapling device being effected by the looping device. After the associated webs have been stapled, they can be given a longitudinal fold on the line of the staples. As many staples can be inserted into the part of the webs that is to constitute one product, as desired, depending upon the number of times that the webs are held stationary between the looping rollers 176 and 186, and two, three, or more staples can be inserted, if desired, or a plurality of stapling devices may be used between the rollers 176 and 186, as hereafter described. Of course to effect this, the speed of the shaft 183, and the shape of the cam will be arranged to accomplish the desired result. Thus, by means of this simple and effective apparatus, it is possible to easily and nicely fasten the associated webs permanently together.

Figure 12:
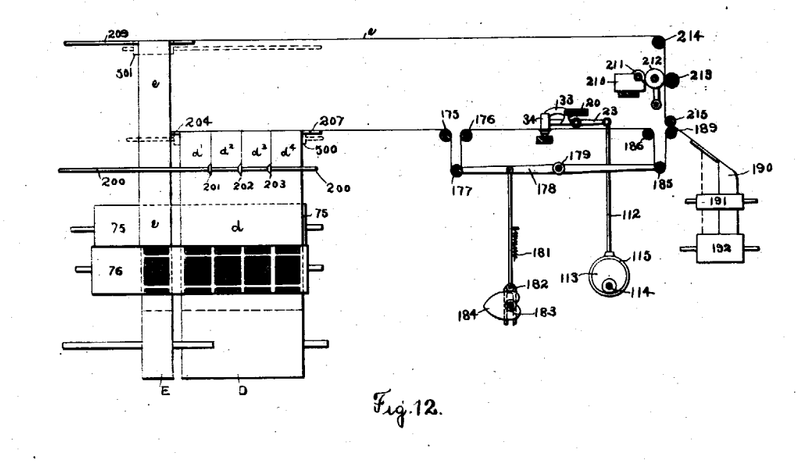
Fig. 12 illustrates the way the associated product of a single press is handled.

Instead of associating a plurality of different webs together, it is possible to sever a wide web into a plurality of narrow webs, associate the narrow webs, and then staple these associated webs; and also, with either device, one web can be made a cover or supplement, or, a separate web can be run, which may be used as a cover. This last described form of my device is shown in Figs. 11 and 12. In this device wide printing couples are used, which are adapted to print and perfect a wide web $d$, and a narrow web $e$, the webs being led from the web-rolls D and E respectively. This narrow web $e$ may be used, if desired, for a cover or outside supplement. The web $d$ may be slit three times, if desired, so as to form four narrow webs, and the web $e$ can be either the width of one of these narrow webs, or twice the width of one of these narrow webs, to get different products, as hereafter described. The web $d$ from the last impression cylinder 75 is split into a number of narrow webs, as by means of the cutters 201, 202, and 203, mounted upon the shaft 200, which cutters coöperate with similar cutters arranged underneath the web, thus forming four narrow webs $d^1$, $d^2$, $d^3$, and $d^4$. These narrow webs are then led over the roll 500 to the turner bars 204, 205, 206 and 207, which serve to associate the narrow webs, as is well understood.

From the last impression cylinder, the cover e is led around the roll 501, then around the turner bar 209, then around a roll 214 to a roll 215; and interposed between the rollers 214 and 215 is a pasting device, which may consist of a suitable paste-box 210, which has a suitable pasting roller 211, which deposits paste upon the lining-roller 212, between which rollers 212 and 213, the web e is led.

From the turner bars, the associated narrow webs are led through a looping device, and through a stapling device, which are substantially the same as described, in connection with the device shown in Fig. 10, and at the roll 189, which is placed close to the roll 215, the cover with its lining of paste may be added to the associated stapled webs, and then thereafter this product, with its cover, may be folded, cut off and delivered. Of course this cover e could be a part of the main web d, if desired, or could be led in from a separate and different machine, as desired.

With a machine organized as shown in Figs. 11 and 12, either a four-page, eight-page, twelve-page, or sixteen-page pamphlet can be run, with or without a cover, these various arrangements being obtained, of course, by using wide or narrow webs, and by properly placing the plates upon the type-cylinders. Thus, this press last described, is especially adapted for a large variety of pamphlet work. The product of this last described mechanism is a pamphlet, the various parts of which are stapled together, and which, if desired, may have a cover which is pasted on to the pamphlet, so as to hide the staples. This produces a very neat and attractive pamphlet, and the cover, of course, may be printed of a different color from that of the body, or upon a differently colored paper.

Figure 13:
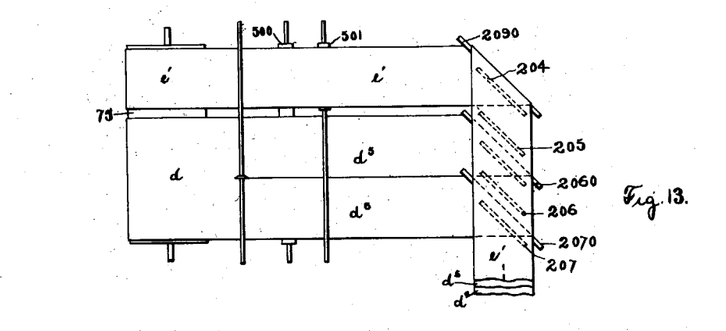
Fig. 13 is a diagrammatic plan showing how a double cover may be used in connection with the device shown in Fig. 12.

It will be seen that in the device shown in Fig. 12, the product can be made of double the width of that there described. This can be done by arranging a slitter and turner bars, as shown in Fig. 13. Only one slitter 202 is used upon the web d to cut that web into two narrow portions; and, if a cover is to be used, a cover $e^1$, of double the width of the cover e of the previous device will be used. With this arrangement, the turner bar 209 is preferably moved to the position shown at 2090, or a separate turner-bar 2090 is used; and the turner-bar 206 is moved to the position shown at 2060, or a separate turner-bar 2060 is used; and the turner-bar 207 is moved to the position shown at 2070, or a separate turner-bar 2070 is used; the object of this different arrangement being to keep the center of the associated webs the same, so that the stapling devices can act in the center, and so that the associated product will come properly to the folding machine. Thus, by this arrangement, a two-page or a four-page product can be produced, with or without a cover, of double the width of that produced by the previous arrangement of turner bars.

It will be seen that the cylinders of the printing machines are made long enough, so that this double-width cover $e^1$ can be printed thereby.

Figure 14:
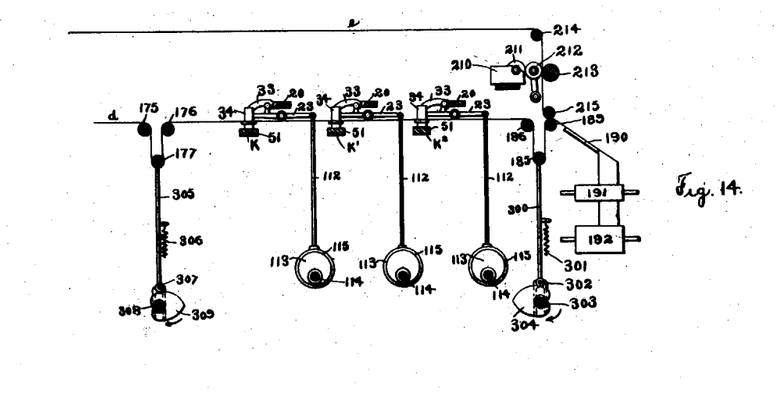
Fig. 14 is a view similar to Fig. 12, showing how a plurality of stapling devices can be arranged.

It has been before stated that a number of stapling devices can be placed between the rollers 176 and 186, and three such stapling devices as K, $K^1$, and $K^2$ arranged between the rollers 176 and 186 are shown in Fig. 14.

In this device, it is preferred to operate the looping rollers by separate cams. Thus, the looping delivery roll 185 can be mounted in arms 300, which will be kept normally in their lowest position by means of springs 301, and these arms will be yoked at their lower ends to straddle a shaft 303, and carry rollers 302, which will bear on the face of the cams 304, a cam being preferably arranged with each arm 300. The looping roller 177 will be arranged in similar yoked arms 305, which will have springs 306 and rollers 307, which will bear upon cams 309 mounted upon shafts 308, a cam being preferably arranged with each arm 305. The cams 309 will be oppositely set relatively to the cams 304, so that one looping roller will move up, as the other looping roller will move down, and thereby the associated webs will be intermittently pulled forward between the rollers 176 and 186.

The stapling devices could be so set and proportioned that staples will be inserted as often as desired into the associated webs, depending, of course, upon the stroke of the looping rollers, and of the various relative positions of the stapling devices. This device shown in Fig. 14, enables the machine to run very rapidly, and is the preferred form of the invention. Thus, it will be seen, that, broadly speaking, the invention may be applied and used in many different locations, and in connection with many different kinds of printing machines.

The results that can be obtained by the various forms of mechanisms will now be recapitulated.

First. Sheets may be collected as desired from one web, and stapled and folded, as shown in Figs. 8 and 8½.

Second. Webs slit from one web, or produced from two or more machines may be associated and stapled and folded, as in Figs. 10 and 11.

Third. Webs may be associated, and sheets severed therefrom, and collected, and then stapled and folded, thereby having as one product the entire lateral and longitudinal product of a press or presses furnishing the web or webs.

Fourth. Covers or supplements may be inserted with the collected sheets, the said covers or supplements being not necessarily in dimensions an equal division of the circumference of the type-cylinders; and the same bound with the product.

Fifth. All the pages of a pamphlet may be associated, stopped and stapled, and thereafter a cover pasted on the stapled product. The cover web may be fed by the main machine, or may be the product of another and separate press.

Having thus fully described the invention, what is claimed is:—

1. The combination with a printing press, a device for assembling printed products coming therefrom, a stationary stapling device, means for causing the same to act intermittently, means for carrying the assembled products as they are made through the stationary stapling device, and means for effecting a momentary stationary relation between the assembled product and the stapling device as the same acts.

2. The combination of a web-associating mechanism, a stationary wire stapling device, means for leading the associated webs on the run through the stationary stapling device, and means for effecting a momentary stationary relation between the wire stapling device and the webs while the stapling device acts.

3. The combination of a web-associating mechanism, a stationary stapling device, means for advancing the associated webs through the stationary stapling device, means for effecting a momentary stationary relation between associated webs and the stapling device while the latter acts, and means for cutting off the ends of the associated and stapled webs.

4. The combination of a web-associating device, a stationary stapling device, means for leading the associated webs on the run through the stationary stapling device, means for momentarily stopping the section of the associated webs in the stapling device and then advancing the same at an accelerated speed, and means for causing the stationary stapling device to act while the section of the associated webs stands still in the stapling device.

5. The combination of a web-associating mechanism, a stationary stapling device, a folder mechanism, means for continuously leading the associated webs from the web-associating mechanism to the folder, means for causing the section of associated webs passing through the stapling device momentarily to dwell and then to advance at an accelerated speed, and means for causing the stapling device to act during the dwell of the associated webs.

6. The combination of means for associating a plurality of webs, a plurality of stationary stapling devices, means for leading the associated webs through the plurality of stationary stapling devices, means for causing the section of associated webs in the plurality of stationary stapling devices momentarily to stand stationary and then to advance at an accelerated speed, and means for operating the plurality of stationary stapling webs while the section of the associated webs therein stands stationary.

7. The combination of a web-associating mechanism, a plurality of stationary stapling devices arranged in line, means for leading the associated webs through said stapling devices, means for causing said associated webs momentarily to stand still and then to advance at an accelerated speed, means for operating the stapling devices while the associated webs stand stationary, and a folder mechanism for folding said associated webs on the line of said staples.

8. The combination with a web associating device, of a stapling device adapted to staple the associated webs together, and a web looping device adapted to momentarily hold the webs stationary while the stapling device acts.

9. The combination with a printing mechanism and folding mechanism, means for leading the product of the printing mechanism to the folding mechanism, an assembling mechanism arranged between the printing mechanism and the folding mechanism, a stationary stapling mechanism arranged between the assembling mechanism and the folding mechanism, means for causing the same to act intermittingly, and means for effecting a momentary stationary relation between the assembled product and the stapling mechanism while the assembled product is passing from the printing mechanism to the folding mechanism as the stationary stapling device acts.

10. The combination with a printing mechanism of a folding mechanism, means for leading the product of the printing mechanism to the folding mechanism, an assembling mechanism arranged between the printing mechanism and the folding mechanism, a stationary stapling mechanism arranged between the assembling mechanism and the folding mechanism, means for effecting a momentary stationary relation between the assembled product and the stapling mechanism, and means for assembling a cover with the assembled product of the press.

11. The combination with a web associating mechanism of two oppositely moving loopers around which the associated webs are looped, means for vibrating the loopers in opposite directions whereby the webs between the loopers will be momentarily held stationary, and a stapling device adapted to operate while the webs are momentarily held stationary.

12. The combination with a web associating mechanism of a stapling mechanism adapted to staple the associated webs together, of means for leading a cover in web form to the associated stapled webs, and for pasting the cover to the same, and means for severing the pamphlet, thus formed, from the webs.

13. The combination with a printing mechanism capacitated to print a wide web, means for slitting this wide web into a plurality of narrow webs, and for associating the same, a stapling device adapted to staple the associated webs together, a printing mechanism adapted to print a cover, a pasting mechanism adapted to act on the web that is to form the cover, and means for assembling the cover with the associated narrow webs, and for cutting the pamphlet thus formed from the webs.

14. The combination with a web printing press capacitated to print upon a wide web, slitters for slitting this wide web into a plurality of narrow webs, means for momentarily stopping the associated webs, a stapling device adapted to staple the associated narrow webs together, a printing mechanism adapted to print a cover, a pasting device for the cover, means for assembling the cover with the associated stapled narrow webs, a folder and a cutting mechanism for folding and cutting the pamphlets thus formed.

15. The combination with a web associating mechanism, a folder to which the associated webs are led, guide rollers around which the associated webs may be twice looped, looping rollers around which the associated webs are led, means for oppositely operating these looping rollers, whereby the associated webs will be held momentarily stationary, and a stapling device arranged between the loops in the webs adapted to act while the webs are momentarily held stationary.

16. A device for binding together a plurality of associated webs, consisting of web guides or rollers as 175, 176, and 186, 189, of the looping rollers 177 and 185, the pivoted arms 178 in which the looping rollers are mounted, means as a heart-shaped cam for vibrating the pivoted arms, and a wire stapling device arranged between the rollers 176 and 186.

17. The combination with means for associating a plurality of webs, of a looping device carrying the associated webs, and adapted to hold a portion of them momentarily stationary, and of a plurality of stapling devices adapted to act to bind the associated webs together while the associated webs are momentarily stationary.

18. The combination of means for associating a plurality of webs, of two oppositely moving looping rollers around which the associated webs are led, whereby a portion of the associated webs will be held momentarily stationary, and of a number of stapling devices arranged between the two looping devices, and adapted to act to bind the associated webs together while they are held stationary by the looping devices.

In testimony whereof I have hereunto set my hand, in the presence of two subscribing witnesses.

H. A. WISE WOOD.

Witnesses:
HENRY W. COZZENS, Jr.,
LOUIS W. SOUTHGATE.